(12) United States Patent
Menet

(10) Patent No.: US 11,236,550 B2
(45) Date of Patent: Feb. 1, 2022

(54) FABRICATION OF PIPE BUNDLES OFFSHORE

(71) Applicant: Acergy France SAS, Suresnes (FR)

(72) Inventor: Florent Menet, Bezu St Eloi (FR)

(73) Assignee: Acergy France SAS, Suresnes (FR)

( * ) Notice: Subject to any disclaimer, the term of this patent is extended or adjusted under 35 U.S.C. 154(b) by 0 days.

(21) Appl. No.: 16/487,081

(22) PCT Filed: Feb. 20, 2018

(86) PCT No.: PCT/IB2018/000422
§ 371 (c)(1),
(2) Date: Aug. 19, 2019

(87) PCT Pub. No.: WO2018/154393
PCT Pub. Date: Aug. 30, 2018

(65) Prior Publication Data
US 2020/0378191 A1    Dec. 3, 2020

(30) Foreign Application Priority Data

Feb. 21, 2017   (GB) ..................................... 1702786

(51) Int. Cl.
*E21B 17/01*    (2006.01)
*B63B 35/03*    (2006.01)
(Continued)

(52) U.S. Cl.
CPC .............. *E21B 17/01* (2013.01); *B63B 35/03* (2013.01); *E21B 19/004* (2013.01); *F16L 1/15* (2013.01); *F16L 1/206* (2013.01)

(58) Field of Classification Search
CPC ....... E21B 17/01; E21B 19/004; B63B 35/03; F16L 1/15; F16L 1/206

(Continued)

(56) References Cited

U.S. PATENT DOCUMENTS 3,280,908 A * 10/1966 Todd ....................... E21B 17/01
166/340
3,410,096 A * 11/1968 Schuh ..................... E21B 17/01
405/211

(Continued)

FOREIGN PATENT DOCUMENTS

GB        2 135 748        9/1984
GB         2475108         5/2011
(Continued)

OTHER PUBLICATIONS

PI Specification 17J, "Specification for Unbonded Flexible Pipe," American Petroleum Institute, 3d ed. 2008.
(Continued)

*Primary Examiner* — Tara Mayo-Pinnock
(74) *Attorney, Agent, or Firm* — Levy & Grandinetti

(57) ABSTRACT

A pipeline bundle for a riser tower or tie-back is manufactured offshore by suspending the bundle from an installation vessel, adding structural core sections successively to an upper end of the suspended bundle, lowering the bundle after adding each successive core section, and feeding one or more lengths of flowline pipe beside the core sections for incorporation into the bundle. The flowline pipe is coiled on a reel or carousel as a full-length piece before being uncoiled progressively as core sections are added to the lengthening bundle. The flowline pipe is then engaged with guide frames and/or buoyancy blocks supported by the core sections, by movement in a radially-inward direction through a radially-outer opening in a retainer formation. The opening is then closed to hold the flowline pipe in the retainer formation.

25 Claims, 4 Drawing Sheets

(51) Int. Cl.
  *E21B 19/00* (2006.01)
  *F16L 1/15* (2006.01)
  *F16L 1/20* (2006.01)

(58) Field of Classification Search
  USPC .................................. 405/158, 166, 169
  See application file for complete search history.

(56) References Cited

U.S. PATENT DOCUMENTS

| | | | |
|---|---|---|---|
| 2010/0232884 A1* | 9/2010 | Roodenburg et al. | F16L 1/23 405/166 |
| 2011/0280667 A1* | 11/2011 | Branchut et al. | F16L 1/123 405/224.2 |
| 2015/0285409 A1 | 10/2015 | Espinasse et al. | |

FOREIGN PATENT DOCUMENTS

| | | |
|---|---|---|
| WO | WO 02/053869 | 7/2002 |
| WO | WO 2004/068012 | 8/2004 |
| WO | WO 2007/108673 | 9/2007 |
| WO | WO 2008/056185 | 5/2008 |
| WO | WO 2010/035248 | 4/2010 |
| WO | WO 2010/055334 | 5/2010 |
| WO | WO 2011/050064 | 4/2011 |
| WO | WO 2011/099852 | 8/2011 |
| WO | WO 2011/117607 | 9/2011 |
| WO | WO 2012/065218 | 5/2012 |
| WO | WO 2013/114211 | 8/2013 |
| WO | WO 2014/168471 | 10/2014 |
| WO | WO 2015/071411 | 5/2015 |
| WO | WO 2016/094992 | 6/2016 |
| WO | WO 2018/033592 | 2/2018 |

OTHER PUBLICATIONS

API Specification 5L, "Specification for Line Pipe," American Petroleum Institute, 45th ed. Dec. 2012.
API Recommended Practice 17B, "Recommended Practice for Flexible Pipe," American Petroleum Institute, 5th ed. May 2014.
API Recommended Practice 1111, "Design, Construction, Operation, and Maintenance of Offshore Hydrocarbon Pipelines," American Petroleum Institute, 5th ed. Sep. 2015.

* cited by examiner

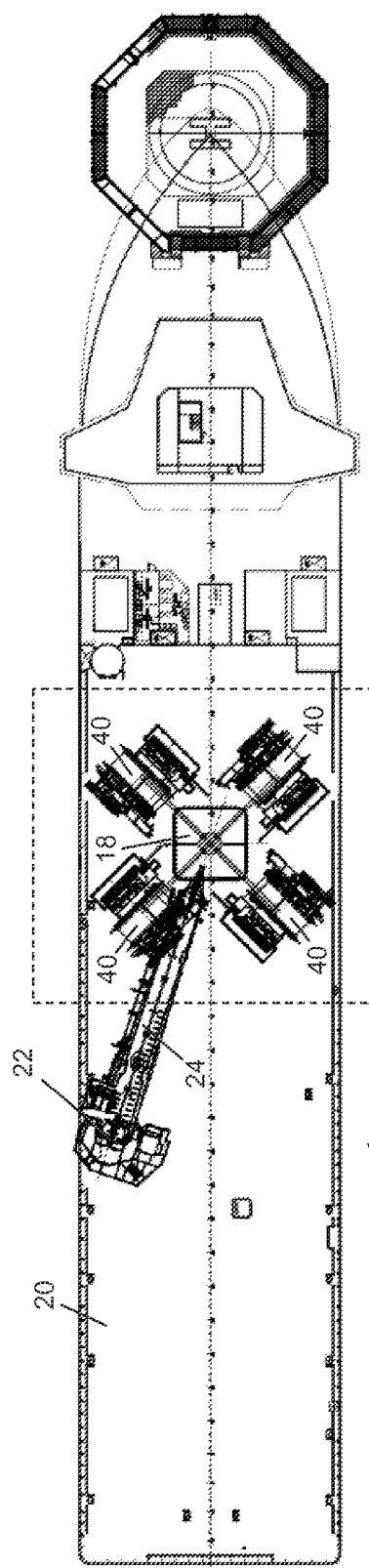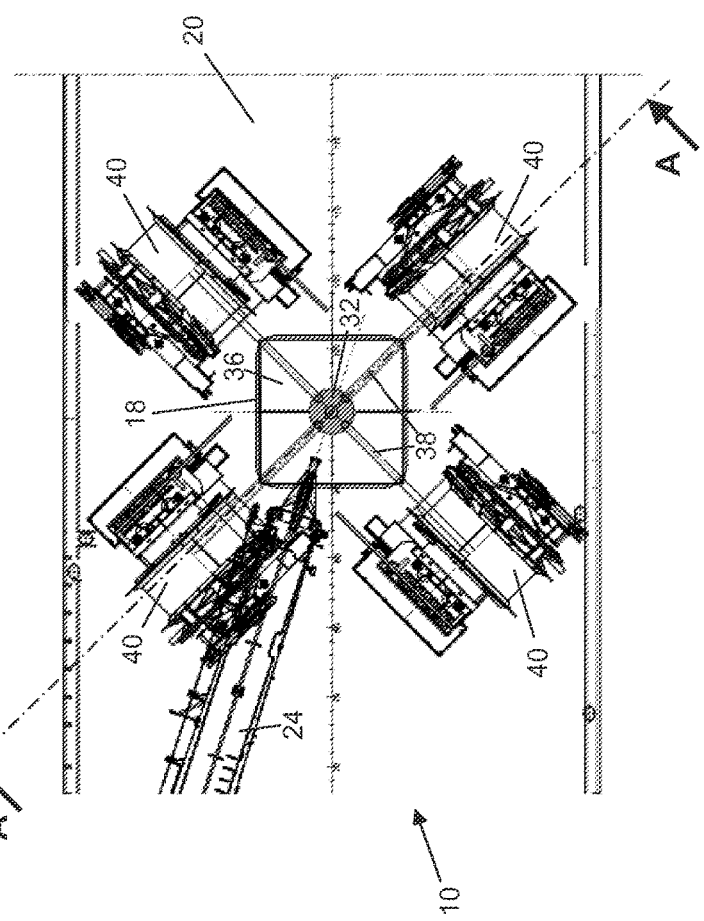

FABRICATION OF PIPE BUNDLES OFFSHORE

This invention relates to the fabrication of subsea pipe bundles, as used in the offshore oil and gas industry. Such bundles are apt to be used in substantially vertical orientation in riser towers but may also be laid substantially horizontally on the seabed as tie-backs.

A riser tower, also known as a hybrid riser tower or HRT, is an upright elongate structure that supports or includes at least one upright riser line. When installed in the sea, the tower extends upwardly in the water column from a seabed foundation to a sub-surface buoyant body at the top of the tower that keeps the tower upright and under tension.

Depending upon the water depth, a riser tower may extend upwardly from the seabed by more than a kilometre. Yet, the buoyant body at the top of the tower remains deep enough in the water that the tower substantially avoids the effects of wave action at the surface. A depth of 70 m to 250 m is typical for this purpose, depending upon the sea conditions expected at a particular location.

Usually there are two or more riser lines extending substantially in parallel along the riser tower. The, or each, riser line extends from a production pipe on the seabed to a flexible jumper pipe that hangs as a catenary between the top of the riser line and a surface installation that receives production fluids comprising oil and/or gas. The surface installation may, for example, be a production platform or a production, storage and offloading vessel (FPSO). The jumper pipes add compliancy that decouples the riser tower from surface movement induced by waves and tides. The riser tower experiences less stress and fatigue as a result.

WO 02/053869 to the Applicant discloses a typical riser tower. Such a tower may comprise various elongate elements extending substantially parallel to the riser line(s), such as lines, pipes or cables that convey other fluids, power and data in either direction between the seabed and the surface. In particular, umbilicals and other pipes generally follow the paths of the riser lines and jumper pipes to carry power, control data and other fluids. As a result, the bundle in the riser column may comprise some pipes used for oil production, some pipes used for injection of water and/or other fluids, some gas-lift lines and/or some other pipes used for oil and gas export. Those pipes are clustered around a central core that may be a hollow, solely structural tube or that may convey fluids in use.

The tower may also comprise a longitudinal series of blocks of syntactic foam to distribute buoyancy along the length of the tower and optionally also to provide thermal insulation for the riser line(s).

Thus, most of the length, or height, of a typical riser tower is a column that comprises or supports an upright bundle of pipes. Specifically, its core structure comprises: a bundle of core pipes or a core tendon to withstand mechanical loads such as bending and tension; and a longitudinal series of guide frames to connect risers to the core structure and to support foam blocks. For example, WO 2010/035248 discloses typical guide frames with clamps for holding the riser pipes within grooves.

This bundle structure, without an external carrier pipe, is similar to a pipeline bundle arranged to be laid on the seabed as a tie-back, where a conventional external carrier pipe is replaced by an internal core pipe. Indeed, some such pipeline bundles are substantially identical to bundles used in riser towers.

The manufacture of subsea pipe bundles, be they for tie-backs or for riser towers, is a complex process that has conventionally been done entirely at an onshore yard. The completed bundle is pulled from the yard into the sea and is then towed to above an installation site before sinking for installation, as described in WO 2008/056185. The bundle may be towed at the surface or submerged in mid-water between the surface and the seabed.

Onshore fabrication of a pipe bundle requires a large area of coastal land in which to manufacture core pipes, riser lines and guide frames and to assemble them together. For example, WO 2016/094992 shows a coastal yard where pipelines welded on parallel paths are bundled together onto a central core pipe. Such large and, especially, lengthy facilities extending for kilometres inland are expensive to acquire and are not available near every potential installation site.

In WO 2010/055334, shorter bundle sections are assembled onshore and are then towed to shallow water to be welded together in a cofferdam. However, a cofferdam is bulky and expensive. Also, ensuring leak-tightness of riser lines requires extensive and expensive non-destructive testing to inspect the welds. This is particularly difficult to implement effectively within the environment of a cofferdam.

To mitigate these problems, WO 2011/099852, GB 2475108 and WO 2011/050064 teach how riser towers may be assembled offshore. In these examples, a core structure comprising a core pipe and guide frames is assembled offshore using a J-lay tower of an installation vessel. The core structure is then installed underwater by docking a lower end of the structure to a pre-installed seabed foundation. Next, riser pipes are fabricated separately on an installation vessel, suspended from a crane, and attached to the already-installed core structure.

These offshore assembly methods rely upon remotely operated vehicles (ROVs) and remotely-operable clamps to ensure the integrity of the assembled structure. Subsea remote assembly operations face inherent difficulty in controlling the position, orientation and alignment of large components so as to ensure leak-tightness and structural integrity. Even in the calmest of seas, it is difficult to align such long, upright and substantially rigid items as the core structure and a riser suspended from a crane. Any clashes between them could destroy the riser and/or the core structure.

WO 2012/065218, WO 2015/071411 and GB 213578 each disclose risers that are installable from a vessel in sections.

US 2015/0285409 describes a method of assembling and deploying a pipeline from a vessel, in which sections of pipe are connected end-to-end and lowered vertically through a well in the deck. Heating lines are inserted into grooves provided in thermally insulating sleeves of the pipe sections.

In WO 2014/168471, pre-assembled riser strings are deployed from a vessel using a J-lay technique.

This specification refers variously to rigid pipes, flexible pipes and composite pipes. Each of those terms has a specific meaning to technicians in the subsea oil and gas industry, to whom this specification is addressed as persons skilled in the art.

It is important to understand that in the lexicon of the industry, nominally 'rigid' pipes have enough flexibility to be bent along their length if a sufficient minimum bend radius (MBR) is observed. Yet, such pipes are not regarded in the industry as being 'flexible' pipes. 'Composite' pipes are regarded in the industry as being distinct from both rigid pipes and flexible pipes but they have more in common with rigid pipes, albeit permitting a greater range of elastic bending strain than similarly-sized rigid pipes.

Examples of rigid pipes used in the subsea oil and gas industry are specified in the American Petroleum Institute (API) Specification 5L and Recommended Practice 1111. A rigid pipe usually consists of or comprises at least one solid steel pipe. Additional components can be added to form a composite structure, such as an internal liner layer or an outer coating layer. Such additional components can comprise polymer, metal or composite materials. Rigid pipe joints of steel are typically terminated by a bevel or a thread, to be assembled end-to-end by welding or screwing them together.

The allowable in-service deflection of rigid steel pipe is determined by the elastic limit of steel, which is around 1% bending strain. Exceeding this limit causes plastic deformation of the steel. It follows that the MBR of rigid pipe used in the subsea oil and gas industry is typically around 100 to 300 metres depending upon the cross-sectional dimensions of the pipe. However, slight plastic deformation can be recovered or rectified by mechanical means, such as straightening. Thus, during reel-lay installation of a rigid pipeline made up of welded rigid pipe joints, the rigid pipeline can be spooled onto a reel with a typical radius of between 8 and 10 metres. This implies a bending strain around 2% for conventional diameters of rigid pipes, requiring the pipeline to be straightened mechanically upon unspooling.

Alternatively, flexible unbonded pipes used in the subsea oil and gas industry are specified in API Specification 17J and Recommended Practice 17B. The flexible pipe body is composed of a composite sandwich-wall structure of layered materials, in which each layer has its own function. Typically, polymer tubes and wraps ensure fluid-tightness and thermal insulation. Conversely, steel layers or other elements provide mechanical strength to resist tensile loads and hydrostatic pressure; for example, interlocked steel tapes form a carcass or pressure vault and a tensile armour is formed of helically-wound wire. Flexible pipes are terminated and assembled by end fittings. Unlike rigid pipelines that are assembled from multiple pipe joints, flexible pipelines are typically manufactured continuously to the desired length between their end fittings.

The composite structure of a flexible pipe allows a large bending deflection without a similarly large increase in bending stresses. The bending limit of the structure is determined by the elastic limit of its outermost plastics layer, typically the outer sheath, which limit is typically 6% to 7% bending strain. Exceeding that limit causes irreversible damage to the structure. Consequently, the MBR of flexible pipe used in the subsea oil and gas industry is typically between 3 and 6 metres.

Composite pipes are not yet specified in standards adopted by the subsea oil and gas industry. However, as understood by the skilled addressee and as used in this specification, composite pipes are pipes whose structural strength, in terms of resistance to bending along their length, is derived wholly, substantially or predominantly from one or more composite materials. Typically, composite pipes comprise layers of angled polymer wraps. WO 2011/117607 discloses an example of a polymer composite pipe based on PEEK (polyetheretherketone).

Like rigid pipes of steel, composite pipes have elastic flexibility to bend along their length but they can sustain substantially greater deflection than equivalent rigid pipes while remaining in the elastic domain. Thus, a composite pipe can be bent around a significantly smaller MBR than an equivalent rigid pipe, if that rigid pipe is not to require subsequent straightening. However, unlike a rigid pipe where limited plastic deformation can be recovered, exceeding the elastic limit of a composite pipe will cause irreversible damage to the structure of the pipe.

It should be noted that composite materials are not synonymous with composite structures. Composite materials (often shortened to 'composites') are materials made from two or more component materials with different but complementary properties. The composite nature of a composite material is intrinsic to that material itself. The component materials remain distinct from each other in the composite material but, when working together, the component materials confer characteristics on the composite material that are different from those of the individual component materials. An example of a composite material is a reinforced plastics material such as a fibre-reinforced polymer, being a combination of reinforcing fibres embedded in a matrix of polymer.

In contrast, composite structures are structures made of two or more components of different materials. The material of each component is chosen to perform the function of that component and to optimise the structure as a whole. Examples of composite structures used in the subsea oil and gas industry are a layered flexible pipe or a lined or coated rigid pipe, each of which typically comprises one or more components of carbon steel and one or more other components of different materials such as polymers or corrosion-resistant alloys. The composite structure may include one or more components made of composite materials, but not necessarily so. Thus, the composite nature of a composite structure is extrinsic to any of the materials from which the components of that structure are made.

Against this background, the present invention provides a method of assembling an elongate pipeline bundle offshore aboard an installation vessel. The method comprises: suspending the bundle from the vessel so that the bundle hangs in an upright orientation underwater beneath the vessel; successively attaching pre-fabricated elongate structural core sections to a corresponding uppermost core section already incorporated into the bundle, in each instance to become a newly-uppermost core section of the bundle; and after attaching each core section, lowering the bundle in a downward launch direction to suspend the bundle from the newly-uppermost core section.

In accordance with the invention, the method further comprises incorporating a length of flowline pipe into the bundle aboard the vessel, a portion of that pipe already incorporated into the bundle extending along the bundle beside the successive core sections. The flowline pipe may be a flexible pipe, a composite pipe or a rigid pipe as herein defined.

The flowline pipe is suitably uncoiled from coiled storage for incorporation into the bundle.

The flowline pipe may be fed on a feed path that converges with the launch direction. In that case, the flowline pipe may be bent along its length to follow the feed path.

Relative movement of the flowline pipe may be effected in a radially-inward direction with respect to a core section for incorporation into the bundle. For example, that relative movement of the flowline pipe may take place as the bundle is lowered in the launch direction. That relative movement of the flowline pipe may be at least partially effected by movement of a core section in the launch direction, which suitably takes place after incorporation of that core section into the bundle.

The flowline pipe may be inserted into a longitudinally-extending retainer formation of the bundle through a radially-outer opening of the retainer formation. For example, the flowline pipe may be inserted into the retainer formation progressively in a longitudinal direction. In that case, the flowline pipe is suitably inserted first into a lower part of the retainer formation and then into an upper part of the retainer formation.

The radially-outer opening of the retainer formations may be closed to hold the flowline pipe in the retainer formation. In that case, the flowline pipe may be pressed into the retainer formation by applying a closure that closes the radially-outer opening of the retainer formation.

The flowline pipe suitably extends along successive core sections of the bundle as a continuous piece. The flowline pipe may be stored offshore as a full-length piece before its incorporation into the bundle.

The flowline pipe is suitably engaged with guide frames that extend radially outwardly from the core sections of the bundle. In that case, the bundle may be suspended from successive ones of the guide frames after lowering the bundle in the launch direction.

The flowline pipe may be engaged with buoyancy blocks supported by core sections of the bundle.

The bundle is apt to be incorporated into a riser tower or a subsea tie-back, which also fall within the inventive concept.

The inventive concept also embraces apparatus for assembling an elongate pipeline bundle offshore. The apparatus comprises: hang-off equipment for suspending the bundle from the vessel; a connection workstation for adding structural core sections successively to an upper end of the suspended bundle; lowering equipment for lowering the bundle in a downward launch direction after adding each successive core section; and pipe feed equipment for feeding a length of flowline pipe beside the core sections for incorporation into the bundle.

The apparatus may further comprise: lifting equipment for lifting the structural core sections to the upper end of the suspended bundle; and/or pipe storage upstream of the pipe feed equipment. Such pipe storage may be arranged to store the flowline pipe in a coiled configuration.

The pipe feed equipment suitably defines a feed path that converges downwardly with the launch direction. The feed path may be disposed above the hang-off equipment. Guide equipment may be provided to bend the flowline pipe along its length to follow the feed path. The feed path is suitably arranged to divert the flowline pipe in a radially-inward direction with respect to a core section incorporated into the bundle.

The inventive concept extends to an installation vessel comprising the apparatus of the invention.

As noted above, rigid pipes, flexible pipes and composite pipes may all have enough flexibility, in principle, to be bent elastically or reversibly along their length to an extent sufficient for the purposes of the invention. This allows such pipes to adopt a compactly-curved, coiled configuration for storage and transportation on a reel or carousel, without sustaining permanent or irreversible damage or deformation, and then to straighten, or to be straightened, for assembly into a pipe bundle.

Thus, the present invention addresses the problems of offshore construction of a riser tower or a pipeline bundle by taking advantage of new pipeline materials and structures that are now available, such as flexible pipeline and composite pipeline. Both are flexible enough to be stored onboard a surface vessel on a reel or carousel with a small radius of curvature. However, in principle, reeled rigid pipeline could also be used in the invention, even if it may require straightening and/or oversizing of some equipment to cope with the greater radius of curvature required by the lesser flexibility of rigid pipe.

'Pipeline' will be understood to encompass a riser pipeline, which differs only by its orientation from a pipeline laid on the seabed.

The availability of riser pipes with sufficient flexibility allows a full-length continuous riser to be stored aboard an installation vessel or aboard an ancillary barge supplying such a vessel. It also simplifies connection of the riser to the core structure: the invention modifies the manufacture of riser tower bundles by displacing the location for connection of risers to the core structure, which is made possible by the flexibility of these pipes.

The invention employs a succession of prefabricated structural core sections that are welded in turn to corresponding structural core sections at the top of a partially-fabricated pipeline bundle. As structural core sections are added successively to the top, the growing bundle hangs down from the installation vessel and so is launched progressively in stepwise fashion downwardly into the sea.

Each structural core section typically comprises: a core pipe, which may comprise one or more pipe joints; a guide frame, welded, clamped or otherwise attached to the core pipe at or near the top, which frame may be used as a weight-supporting hang-off collar; and optionally one or more foam blocks, typically of syntactic foam, providing buoyancy and/or thermal insulation and/or formations for damping vortex-induced vibrations (VIV). As individual risers may have their own layers of thermal insulation, the foam blocks may serve primarily to add buoyancy rather than for their thermally-insulating effect.

The guide frames and foam blocks may comprise longitudinally-extending grooves or recesses that are open to the radially outer side. Such female formations can accommodate risers inserted in a radially-inward direction toward the central longitudinal axis of the core pipe. Those formations can be closed with barriers such as clamps or straps after a riser has been inserted, in a manner similar to that disclosed in WO 2010/035248, so as to retain the riser within.

The foam blocks may be axially slideable relative to the core pipe but lockable against such movement during lifting by pins or straps. Alternatively, the foam blocks may be clamped to the core pipe and/or held against axial movement relative to the core pipe by the guide frames and/or by stop formations on the core pipe. In either case, the foam blocks may be circumferentially continuous around the core pipe or circumferentially distinct around the core pipe.

The structural core sections are upended in turn by a hoisting system that may, for example, comprise a crane, an erector arm or a travelling clamp of J-lay tower.

The length of a structural core section is determined by the height available between the welding station and the highest hoisting point, which may be the tip of a crane jib or the highest reach of a travelling clamp of a J-lay tower. For example, a structural core section can be 24 metres in length, which corresponds to the length of a double pipe joint comprising two standard pipe joints welded end-to-end. In this respect, standard pipe joints have a nominal length of 40 ft (approximately 12 metres) each.

Once upended, the core pipe of the structural core section is butt-welded to the core pipe at the top of an existing partially-fabricated bundle suspended from a hang-off bushing. Typically, the uppermost guide frame of the existing bundle serves as a hang-off formation that engages the top of the hang-off bushing when that bushing is closed.

One or more riser pipes are continuously unspooled and guided radially inwardly into the longitudinal grooves or recesses of the guide frame and the foam blocks.

Transverse radially-outward movement of the riser out of the grooves or recesses is prevented by closing clamps or applying strapping that closes the radially outer open ends of the grooves or recesses.

With the hang-off bushing then opened to release the guide frame that was supported by it, the hoisting system lowers the top of the bundle assembly by the length of the newly-added structural core section. Then the hang-off bushing is closed and the guide frame of the structural core section at the top of the bundle is laid onto the hang-off bushing to support the weight of the thus-lengthened bundle suspended beneath the vessel.

In specific embodiments, therefore, the invention provides a method for assembling a pipeline bundle aboard an installation vessel. Short structural core sections of the bundle are preliminarily pre-fabricated. Each structural core section is uprighted in turn to be aligned with the pipeline bundle and connected to the pipeline bundle, and at least one pipeline section is attached to the bundle on the installation vessel. The pipeline section may be a riser, in which case the bundle may form part of a riser tower. The inventive concept therefore extends to a riser tower or other subsea pipeline bundle made in accordance with the invention.

Each structural core section may comprise: at least one core pipe and at least one guide frame made integral with the core pipe; pre-assembled polymer foam blocks with grooves for receiving the pipeline section, which blocks may slide along or be fixed in relation to a core pipe of the structural core section; and/or at least one pre-installed pipeline pipe joint.

If the guide frame is wider than the average diameter of the pipeline bundle, the guide frame may be used as a reaction collar for supporting the weight of a structural core section and/or the weight of the bundle. However, other known hang-off formations such as hang-off collars may be provided on the core pipe instead of, or in addition to, guide frames.

Vertical connection between structural core sections and/or between pipeline sections may be achieved by welding or by mechanical connection, such as by bolted flanges, complementary threads or pinbox connectors. The pipeline section is suitably attached to the bundle above the location of vertical connection between structural core sections.

The pipeline may be pre-fabricated and stored on a reel or carousel on the vessel, a short segment of the pipeline being attached to the bundle at every step as each structural core section is uprighted and connected to the bundle. The pipeline may be a flexible pipe, a composite pipe or a rigid pipe that has been reeled or spooled. A rigid pipe may be reeled or spooled with or without plastic deformation. Limited plastic deformation of a rigid pipe may be recovered by well-known straightening operations upon unreeling or unspooling, before the straightened pipe is incorporated into the riser tower.

The pipeline section may attached to the bundle by straps or by clamping.

The bundle is suitably launched into the sea in a substantially vertical direction.

Specific embodiments of the invention also provide a device or apparatus mounted on a vessel for offshore assembly of a pipeline bundle. The device or apparatus comprises: uprighting equipment such as a crane or a J-lay tower system for upending pre-fabricated bundle core sections; hang-off equipment for suspending the pipeline bundle; a connection workstation for connecting an upended pre-fabricated core section to the bundle held by the hang-off equipment; and at least one item of feeding equipment for transversely guiding pipeline sections to the pipeline bundle for attaching the pipeline sections to the pipeline level in the connection workstation.

The hang-off equipment may comprise a bushing that supports a hang-off structure such as at least one guide frame of the pipeline bundle, or may instead comprise a friction clamp.

The feeding equipment may comprise a motorised reel, a guide wheel and/or an arm. Thus, in accordance with the invention, a pipeline bundle for a riser tower or tie-back is manufactured offshore by: suspending the bundle from an installation vessel; adding structural core sections successively to an upper end of the suspended bundle; lowering the bundle after adding each successive core section; and feeding one or more lengths of flowline pipe beside the core sections for incorporation into the bundle.

In embodiments to be described, the flowline pipe is coiled on a reel or carousel as a full-length piece before being uncoiled progressively as core sections are added to the lengthening bundle. The flowline pipe is then engaged with guide frames and/or buoyancy blocks supported by the core sections, by movement in a radially-inward direction through a radially-outer opening in a retainer formation. The opening is then closed to hold the flowline pipe in the retainer formation.

In order that the invention may be more readily understood, reference will now be made, by way of example, to the accompanying drawings, in which:

FIG. 2 is a plan view of the installation vessel shown in FIG. 1;

FIG. 3 is an enlarged detail view corresponding to Detail B of FIG. 2;

Figure 1:
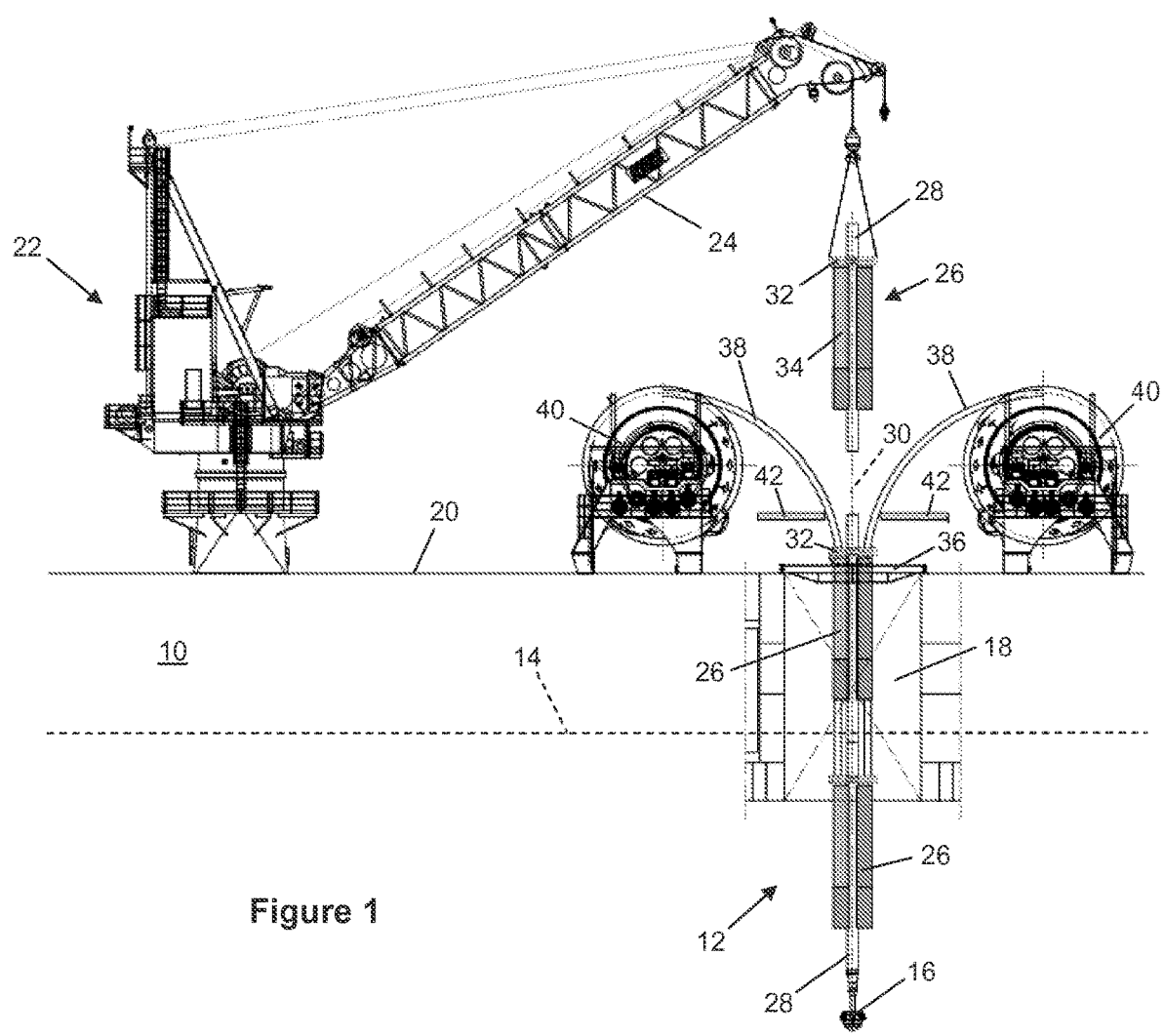
FIG. 1 is a partial sectional side view of an installation vessel adapted in accordance with a first embodiment of the invention, taken on line A-A of FIG. 3, in the process of fabricating a riser tower that is launched through a moonpool of the vessel.

Referring firstly to FIGS. 1 to 3 of the drawings, these show a first embodiment of the invention in its context of use. Here, an installation vessel 10 is shown fabricating a riser tower 12 at an offshore location that may be directly over, or conveniently close to, a subsea installation site for the riser tower 12 upon completion.

The riser tower 12 is shown partially constructed in FIG. 1. The riser tower 12 hangs freely in a substantially vertical orientation in the water column beneath the surface of the sea 14, represented here by a dashed line. The lower or distal end of the riser tower 12 has a pivot formation 16 for anchoring the riser tower 12, when completed, to a seabed foundation (not shown), as is well understood by those skilled in the art. However, this lower end of the riser tower 12 remains clear of the seabed during fabrication and is only brought to the seabed for installation after fabrication of the riser tower 12 has been completed.

It will be apparent that the riser tower 12 remains upright under the tension of its own weight during construction, installation and use. This effectively avoids or resists bending fatigue that arises during the towing and upending operations that are required to install conventionally-manufactured riser towers. It will also be apparent that the riser tower 12 can be fabricated wherever there is deep enough water, without relying upon the limited availability of coastal fabrication yards as used in the prior art.

FIGS. 1 to 3 show that the vessel 10 comprises a moonpool 18 that extends through a working deck 20 of the vessel 10 and into the sea 14. A crane 22 atop the working deck 20 beside the moonpool 18 serves as a hoisting apparatus in this embodiment. The crane 22 has a jib 24 whose lateral reach extends over the moonpool 18.

Other embodiments of the invention may use other hoisting apparatus, such as an erector arm or a travelling clamp of a J-lay tower, as will be explained later with reference to FIG. 4.

FIG. 1 shows that the riser tower 12 comprises a series of modules attached together end-to-end in longitudinal succession as a pipe string. The modules in this example are prefabricated structural core sections 26, each of which comprises a core pipe 28 whose central longitudinal axis 30 coincides with, and defines part of the length of, a central longitudinal axis of the riser tower 12. The core pipe 28, in turn, may comprise a single pipe joint or two or more pipe joints welded end-to-end.

In this example, the length of each structural core section 26, determined by the length of the core pipe 28, is no greater than the lifting height of the crane 22 when its jib 24 is positioned centrally over the moonpool 18.

Each structural core section 26 further comprises a laterally-extending guide frame 32 attached to the core pipe 28 near its upper end. The guide frame 32 in this example extends in a plane substantially orthogonal to the central longitudinal axis 30. The guide frame 32 may be welded or clamped to the core pipe 28. In the latter instance, stop formations on the core pipe 28 suitably provide a back-up to restrain any tendency of the guide frame 32 to slide along the core pipe 28 in use. Such stop formations are well known in the art—see, for example, the discussion in WO 2013/114211—and so need not elaboration here.

Buoyancy blocks 34 of syntactic foam are assembled circumferentially around the core pipe 28 under each guide frame 32. In this way, buoyant upthrust loads are transferred via the guide frames 32 from the buoyancy blocks 34 to the core pipes 28 of the riser tower 12.

In this example, the buoyancy blocks 34 are not required to contribute thermal insulation and so are spaced longitudinally to distribute their buoyancy along the riser tower 12. However, if required for thermal insulation, the buoyancy blocks 34 could abut in longitudinal succession to provide substantially continuous thermal insulation along the riser tower 12.

The buoyancy blocks 34 are preferably pre-installed around the core pipe 28 of each structural core section 26 as shown in FIG. 1. Alternatively the buoyancy blocks 34 could be installed around the core pipe 28 after each structural core section 26 has been added to the string of structural core sections 26 that make up the riser tower 12. In some examples, the buoyancy blocks 34 may be secured by temporary means to allow sliding or locking relative to the structural core section 26.

Short end portions of the core pipe 28 protrude longitudinally beyond the guide frame 32 at an upper end of the structural core section 26 and beyond the buoyancy blocks 34 at an opposed lower end of the structural core section 26. This provides ample longitudinal clearance for access to the core pipe 28 for weld preparation, followed by welding, weld testing and protective coating. Optionally, if continuous thermal insulation is required along the length of the riser tower 12, additional foam blocks could then be placed around the welded and coated joint region.

FIG. 1 shows the partially-completed riser tower 12 at an early stage of construction. The riser tower 12 currently comprises just two structural core sections 26 that have been fixed to each other end-to-end by butt welding between abutting, protruding ends of their core pipes 28. When welded together end-to-end, these core pipes 28 form the principal tensile member of the riser tower 12.

The upper one of the two structural core sections 26 of the riser tower 12 is supported by a hang-off bushing 36 that lies centrally over the moonpool 18. The hang-off bushing 36 closes under the guide frame 32 of that structural core section 26. In this way, that guide frame 32 serves as a hang-off formation to transmit the weight load of the partially-completed riser tower 12 to the vessel 10 via the hang-off bushing 36.

In accordance with the invention, the riser tower 12 further comprises riser pipes 38 that extend continuously from one structural core section 26 to the next along the length of the riser tower 12. The riser pipes 38 are supported by the guide frames 32 spaced longitudinally along the riser tower 12 so as to extend substantially parallel to the successive core pipes 28.

In this embodiment, there are four riser pipes 38 spaced equiangularly in plan view around and outside the core pipes 28 of the structural core sections 26. Other embodiments could have more or fewer riser pipes, from just one riser pipe to more than four riser pipes.

The bottom ends of the riser pipes 38 are suitably anchored to the lowermost structural core section 26 of the riser tower 12. Those ends are suitably provided with bottom end fittings for fluid communication with pipework of a seabed installation to which the riser tower 12 will be connected for use.

The riser pipes 38 are fed from onboard storage apparatus that holds the riser pipes 38 in a compact curved configuration until required. In this example, the storage apparatus comprises respective reels 40 mounted on the working deck 20 of the vessel 10. The 35 reels 40 turn about substantially horizontal axes in respective intersecting or parallel upright planes that converge on, and substantially align with, the common central longitudinal axis 30 of the core pipes 28 that together form the riser tower 12.

The riser pipes 38 may be flexible pipes, composite pipes or rigid pipes. In this example, the riser pipes 38 are composite pipes that are bent elastically around the reels 40. Thus, the riser pipes 38 tend to straighten by elastic recovery as they come off the reels 40.

Guide structures 42 spaced above the hang-off bushing 36 guide the riser pipes 38 from the top of the reels 40 into substantially vertical alignment with the core pipes 28 of the riser tower 12. The MBR appropriate to the particular riser pipes 38 is observed throughout.

As the riser pipes 38 are guided downwardly and laterally into vertical alignment with the core pipes 28, the riser pipes 38 enter, and are retained within, longitudinally-extending retainer formations of the guide frames 32 and the buoyancy blocks 34. As will be explained in more detail in the second embodiment illustrated in FIGS. 4 to 6 of the drawings, this keeps the riser pipes 38 substantially parallel to the core pipes 28.

Several more structural core sections 26 must now be added to complete the riser tower 12. The next such structural core section 26 is shown here having been lifted by the crane 22 from the working deck 20 of the vessel 10 to a central position over the moonpool 18. The downwardly-protruding end of its core pipe 28 is shown in lateral alignment with the opposed upwardly-protruding end of the core pipe 28 of the structural core section 26 at the top of the riser tower 12.

Once the next structural core section 26 has been upended and aligned with the partially-completed riser tower 12 in this way, the opposed core pipes 28 are butt-welded to each other to incorporate the structural core section 26 into the lengthening riser tower 12. The crane 22 can then support the weight of the riser tower 12 through the uppermost structural core section 26, lifting from the hang-off bushing 36 the guide frame 32 that previously bore the weight of the riser tower 12.

With the crane 22 continuing to support the weight of the riser tower 12, the hang-off bushing 36 may then be opened to provide clearance for the guide frame 32 that previously bore the weight of the riser tower 12. This allows the riser tower 12 to be lowered into the sea 14 by the length of the newly-added structural core section 26.

Simultaneously, the riser pipes 38 pay out from their respective reels 40, being drawn from the reels 40, or driven off the reels 40, to an extent required by the downward longitudinal movement of the riser tower 12. Thus, the riser pipes 38 advance from the reels 40 in a stepwise movement synchronised with the stepwise launch movement of the riser tower 12. The reels 40 suitably maintain some back-tension in the riser pipes 38, which encourages the riser pipes 38 to straighten and to stay substantially straight.

Next, the hang-off bushing 36 is closed so that the guide frame 32 of the uppermost structural core section 26 can rest on the hang-off bushing 36, which then again supports the weight of the riser tower 12 suspended beneath the vessel. As the downward launch movement of the riser tower 12 consequently pauses, the reels 40 also pause their dispensing of the riser pipes 38.

The crane 22 is then free to disconnect from the uppermost structural core section 26 and to slew around to pick up another structural core section 26, for example from the working deck 20 of the vessel 10. The fabrication cycle then repeats, whereupon further lengths of the riser pipes 38 are dispensed from the reels 40 to match the lengthening riser tower 12.

Eventually the full length of the riser tower 12 is completed, whereupon the riser pipes 38 may be cut and terminated by suitable top end fittings. Also, a buoyancy module may be added to the top of the uppermost structural core section 26. The riser tower 12 can then be suspended by the crane 22 through the moonpool 18 for installation, when the pivot formation 16 at the lower end of the riser tower 12 is used to anchor the riser tower 12 to a seabed foundation.

The apparent weight load on the crane 22 and the hang-off bushing 36 during fabrication and installation of the riser tower 12 is reduced by the buoyant upthrust of the buoyancy blocks 34 and any additional buoyancy module, when submerged. The weight load and orientation of the riser tower 12 may also be controlled by ballasting or deballasting operations. This may, for example, be achieved by attaching temporary buoyancy to, or removing temporary buoyancy from, the riser tower 12 or by flooding or purging the core pipes 28, the buoyancy module or other such other buoyancy tanks as may be attached permanently or temporarily to the riser tower 12.

Figure 4:
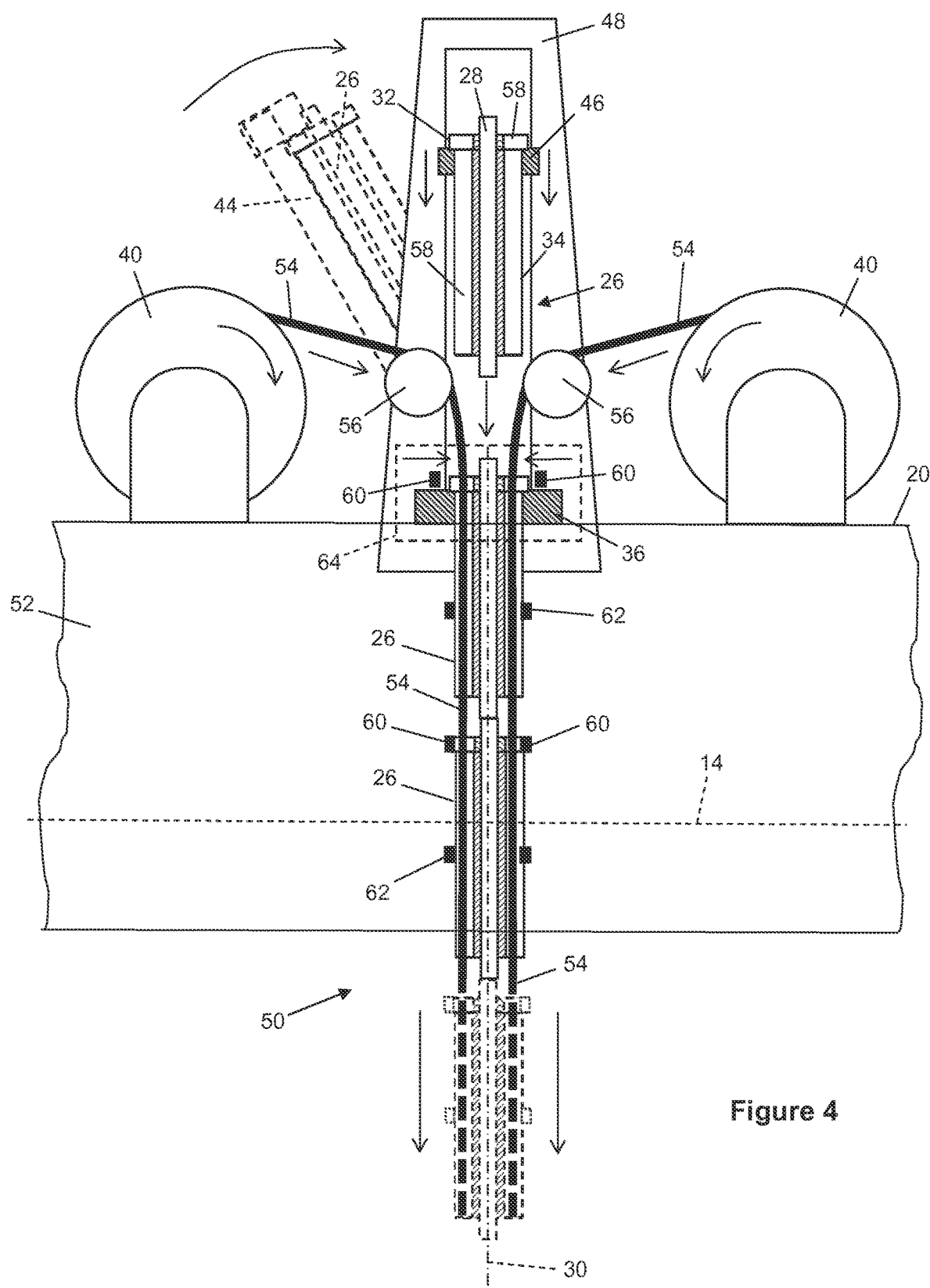
FIG. 4 is a schematic part-sectional side view of a second embodiment of the invention, in which an installation vessel employs a J-lay tower to fabricate a riser tower and launches the riser tower over a side of the vessel.
Figure 5:
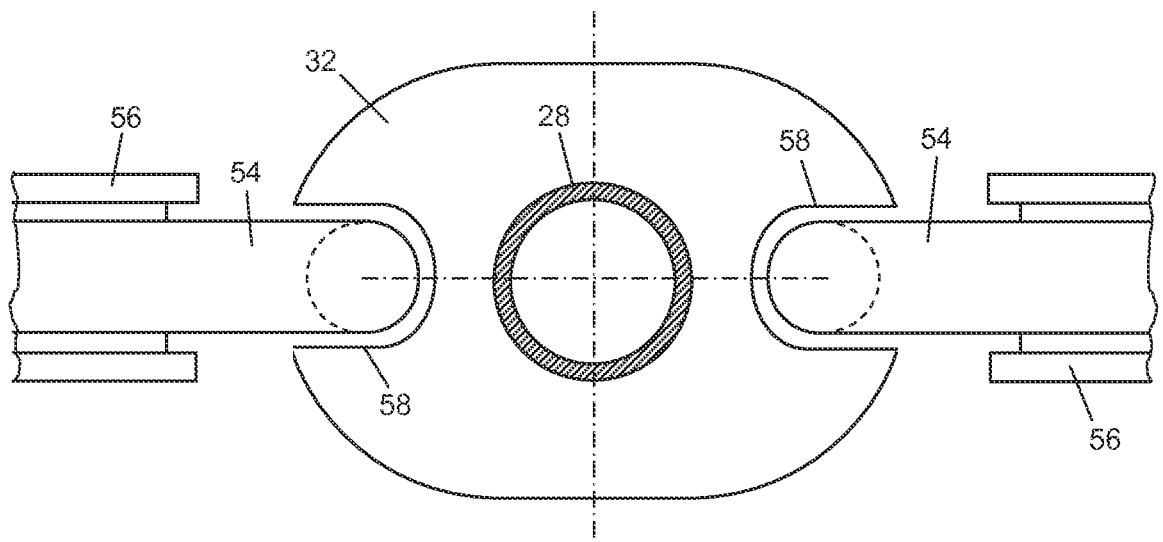
FIG. 5 is a schematic plan view showing how riser pipes may be inserted into recesses in a guide frame of the riser tower of FIG. 4.
Figure 6:
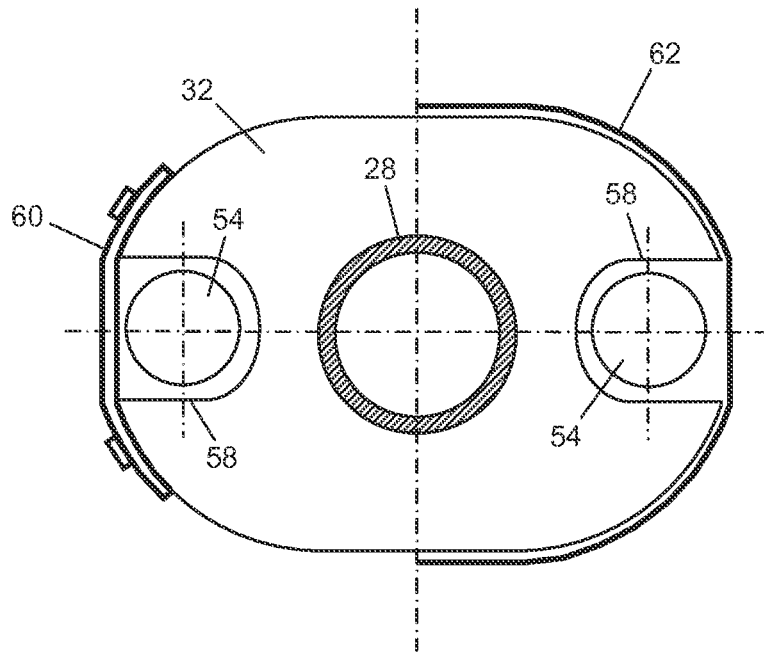
FIG. 6 is a schematic plan view corresponding to FIG. 5 but showing two ways in which the riser pipes may be retained in the guide frame after insertion.

Turning next to the second embodiment shown in FIGS. 4 to 6, like numerals are used for like features. In this example, which is not shown to scale, the hoisting apparatus that lifts and lowers the successive structural core sections 26 comprises a lifting arm 44 and a travelling clamp 46 of a J-lay tower 48. This is distinguished from the crane 22 that serves as hoisting apparatus in the first embodiment. Also, the J-lay tower 48 is supported by an outrigger structure to launch a riser tower 50 over the side or stern of an installation vessel 52 rather than through a moonpool 18.

For ease of illustration, the riser tower 50 in FIGS. 4 to 6 is shown as having two riser pipes 54 that are diametrically opposed about a central core pipe 28. Also, the riser pipes 54 are exemplified as flexible pipes that permit a relatively small MBR. The riser pipes 54 extend from reels 40 and around guide wheels 56 at a level above the hang-off bushing 36. The guide wheels 56 guide the riser pipes 54 into parallel vertical alignment with the core pipes 28 and with each other.

The foregoing description of the first embodiment shown in FIGS. 1 to 3 makes reference to riser pipes being held in longitudinally-extending retainer formations of the guide frames 32 and the buoyancy blocks 34. Examples of such retainer formations are illustrated in the second embodiment shown in FIGS. 4 to 6 and will now be described.

Specifically, the guide frames 32 of the structural core sections 26 and the associated buoyancy blocks 34 have circumferentially-aligned, longitudinally-extending, full-length grooves, cut-outs or recesses 58. As best appreciated in FIGS. 5 and 6, the recesses 58 are open to their radially outer side with respect to the central longitudinal axis 30 of the associated core pipe 28.

As the riser pipes 54 are guided or diverted downwardly and laterally into vertical parallel alignment with the core pipes 28, the riser pipes 54 enter the respective recesses 58 in a radially-inward direction toward the central longitudinal axis 30. A similar effect may arise from downward movement of the structural core sections 26 as they are lowered by the travelling clamp 46 of the J-lay tower 48. The riser pipes 54 will then enter the respective recesses 58 progressively from the bottom of the recesses 58 to the top. This can also occur in the first embodiment as shown in FIG. 1, when the structural core sections 26 are lowered by the crane 22 relative to the converging riser pipes 38.

In each case, the structural core sections 26 move in a downward launch direction and the riser pipes 54 bend as they move along downwardly and radially-inwardly on feed paths that converge with the launch direction. The feed paths end at the recesses 58, where the riser pipes 54 eventually reach parallel relation with the core pipes 28 and hence with the launch direction that coincides with the vertical central longitudinal axis 30.

The radially outer open sides of the recesses 58 are then closed with closures such as clamps 60 or straps 62 to retain the riser pipes 54 in the recesses 58. Clamps 60 or straps 62 may, for example, be applied to the guide frames 32 at a welding station 64 that also houses a hang-off bushing 36. This prevents radially-outward movement of the riser pipes 54 out of the recesses 58 and so keeps the riser pipes 54 substantially parallel to the core pipes 28. Applying clamps 60 or straps 62 may also help to align the riser pipes 54 with the recesses 58 and to press the riser pipes 54 radially inwardly into the recesses 58.

In FIG. 6, an example of a bolted clamp 60 is shown on the left side of the guide frame 32 and an example of a strap 62 is shown on the right side of the guide frame 32. Clamps 60 and straps 62 are also shown schematically in FIG. 4.

Here, clamps 60 are shown being applied to the guide frames 32 with radially-inward movement in a welding station 64 immediately above the hang-off-bushing 36. Straps 62 are, optionally, also applied to the buoyancy blocks 34 to provide extra security.

Many variations are possible without departing from the inventive concept. For example, other storage apparatus could be used instead of reels, such as carousels that turn about substantially vertical axes. Also, the riser pipes may be stored on, and supplied from, offboard storage apparatus that is not on board the installation vessel, for example on a supply barge that is tied to the installation vessel.

Retainers such as clamps or straps may be applied to the riser tower at a further station downstream of, or below, the welding station.

Guide frames need not be incorporated into the structural core sections during pre-fabrication but could instead be fitted to the core pipes at any stage before the riser tower is launched into the sea. This could even be after the core pipes have been incorporated into the top of the riser tower above the level of suspension.

The techniques of the invention are apt to install elongate elements other than riser pipes on the riser tower in addition to the riser pipes themselves. Such elements may be umbilicals for conveying power or service fluids along the riser tower, in parallel to the riser pipes.

There may be more than one core pipe, the core pipes being in concentric or mutually parallel relation.

Pipe joints forming the core pipe may be single-walled or of double-walled 'pipe-in-pipe' construction. The core pipe may serve as a flowline for production fluids and/or as a protective carrier pipe for power or data cables or for other pipes, such as may carry service fluids.

Similar principles could be used to fabricate a pipeline bundle for use in a substantially horizontal orientation as a tie-back structure, in which case the completed bundle can be tipped from a vertical orientation, when underwater, for installation on the seabed. In that application, there will be no need for a top buoyancy module and there may be less need for buoyancy blocks along the bundle, although some removable or floodable buoyancy modules may be used instead or additionally.

If it may be desirable for the lay angle, departure angle or launch angle of the pipe bundle into water to diverge from the vertical while still remaining upright, a J-lay tower may gimbal and tilt to modify that angle, for example by up to 15° from the vertical.

The invention claimed is:

1. A method of assembling an elongate pipeline bundle offshore aboard an installation vessel, the method comprising:
   suspending the bundle from the vessel so that the bundle hangs in an upright orientation underwater beneath the vessel;
   successively attaching pre-fabricated elongate structural core sections to a corresponding uppermost core section already incorporated into the bundle, in each instance to become a newly-uppermost core section of the bundle;
   each pre-fabricated elongate structural core section comprising a core pipe a guide frame that extends radially outwardly from the core pipe, and a buoyancy block; and,
   after attaching each core section, lowering the bundle in a downward launch direction to suspend the bundle from the newly-uppermost core section;
   wherein the method further comprises incorporating a portion of flowline pipe into the bundle aboard the vessel, another portion of that pipe already incorporated into the bundle extending along the bundle beside the successive core sections, by feeding the flowline pipe on a feed path converging with the launch direction and engaging the flowline pipe with the guide frames and the buoyancy blocks of the core sections, that pipe being a flexible pipe, a composite pipe or a rigid pipe.

2. The method of claim 1, comprising uncoiling the flowline pipe from coiled storage for incorporation into the bundle.

3. The method of claim 1, comprising bending the flowline pipe along its length to follow the feed path.

4. The method of claim 1, comprising effecting relative movement of the flowline pipe in a radially-inward direction with respect to a core section for incorporation into the bundle.

5. The method of claim 4, wherein said relative movement of the flowline pipe takes place as the bundle is lowered in the launch direction.

6. The method of claim 5, wherein said relative movement of the flowline pipe is at least partially effected by movement of a core section in the launch direction.

7. The method of claim 6, wherein said movement of the core section takes place after incorporation of that core section into the bundle.

8. The method of claim 4, comprising inserting the flowline pipe into a longitudinally-extending retainer formation of the guide frame through a radially-outer opening of the retainer formation.

9. The method of claim 8, comprising inserting the flowline pipe into the retainer formation progressively in a longitudinal direction.

10. The method of claim 9, comprising inserting the flowline pipe first into a lower part of the retainer formation and then into an upper part of the retainer formation.

11. The method of claim 8, further comprising closing the radially-outer opening of the retainer formation to hold the flowline pipe in the retainer formation.

12. The method of claim 11, wherein the step of closing comprises pressing the flowline pipe into the retainer formation by applying a closure that closes the radially-outer opening of the retainer formation.

13. The method of claim 1, wherein the flowline pipe extends along successive core sections of the bundle as a continuous piece.

14. The method of claim 1, comprising storing the flowline pipe offshore as a full-length piece before incorporation into the bundle.

15. The method of claim 1, comprising suspending the bundle from successive ones of the guide frames after lowering the bundle in the launch direction.

16. The method of claim 1, further comprising engaging the flowline pipe with buoyancy blocks supported by core sections of the bundle.

17. The method of claim 1, wherein the bundle is incorporated into a riser tower or a subsea tie-back.

18. An apparatus for assembling an elongate pipeline bundle offshore comprises:
   hang-off equipment for suspending the bundle from the vessel;
   a connection workstation for adding prefabricated structural core sections successively to an upper end of the suspended bundle, each pre-fabricated elongate structural core section comprising a core pipe, a guide frame that extends radially outwardly from the core pipe, and a buoyancy block;

lowering equipment for lowering the bundle in a downward launch direction after adding each successive core section; and pipe feed equipment for feeding a length of flowline pipe beside the core sections for incorporation into the bundle by engaging with the guide frames and buoyancy blocks, the pipe feed equipment defining a feed path that converges downwardly with, but remains offset from, the launch direction.

19. The apparatus of claim 18, further comprising lifting equipment for lifting the structural core sections to the upper end of the suspended bundle.

20. The apparatus of claim 18, further comprising pipe storage upstream of the pipe feed equipment.

21. The apparatus of claim 20, wherein the pipe storage is arranged to store the flowline pipe in a coiled configuration.

22. The apparatus of claim 18, further comprising guide equipment for bending the flowline pipe along its length to follow the feed path.

23. The apparatus of claim 18, wherein the feed path is arranged to divert the flowline pipe in a radially-inward direction with respect to a core section incorporated into the bundle.

24. The apparatus of claim 18, wherein the feed path is disposed above the hang-off equipment.

25. An installation vessel comprising the apparatus of claim 18.

* * * * *